United States Patent [19]
Longaberger

[11] 4,029,449
[45] June 14, 1977

[54] MOLD BLOW OUT APPARATUS

[76] Inventor: Robert E. Longaberger,
Marshallville Road, R.D. 1, Box 5,
Marshallville, Ohio 44645

[22] Filed: July 14, 1976

[21] Appl. No.: 705,119

[52] U.S. Cl. .............................. 425/28 R; 425/36;
425/38; 425/48; 425/58
[51] Int. Cl.² .......................................... B29H 5/02
[58] Field of Search ............ 425/20, 23, 25, 28 R,
425/32, 33, 35, 36, 38, 43, 48, 52, 58

[56] References Cited
UNITED STATES PATENTS

| | | |
|---|---|---|
| 2,812,545 | 11/1957 | Soderquist ............................ 425/32 |
| 2,880,458 | 4/1959 | Frohlich et al. .................. 425/32 X |
| 2,997,740 | 8/1961 | Soderquist ............................ 425/32 |
| 3,153,263 | 10/1964 | Mallory et al. ...................... 425/32 |
| 3,278,990 | 10/1966 | Joseph et al. ........................ 425/43 |
| 3,443,280 | 5/1969 | Hugger ............................. 425/36 X |
| 3,887,313 | 6/1975 | Jaedicke et al. ................. 425/33 X |

*Primary Examiner*—J. Howard Flint, Jr.
*Attorney, Agent, or Firm*—Hamilton, Renner & Kenner

[57] ABSTRACT

A curing press for tires having relatively movable upper and lower mold sections, a center mechanism, a housing in the center mechanism, a hub attached to the housing, a bead ring carried by the hub for engaging the lower bead of a tire, a lift mechanism operatively engaging the housing for moving the hub relative to the lower mold section, and mold blow out apparatus on the hub for directing pressurized fluid into contact with the lower mold section during the movement of the hub relative to the lower mold section to remove residual foreign matter therefrom.

14 Claims, 4 Drawing Figures

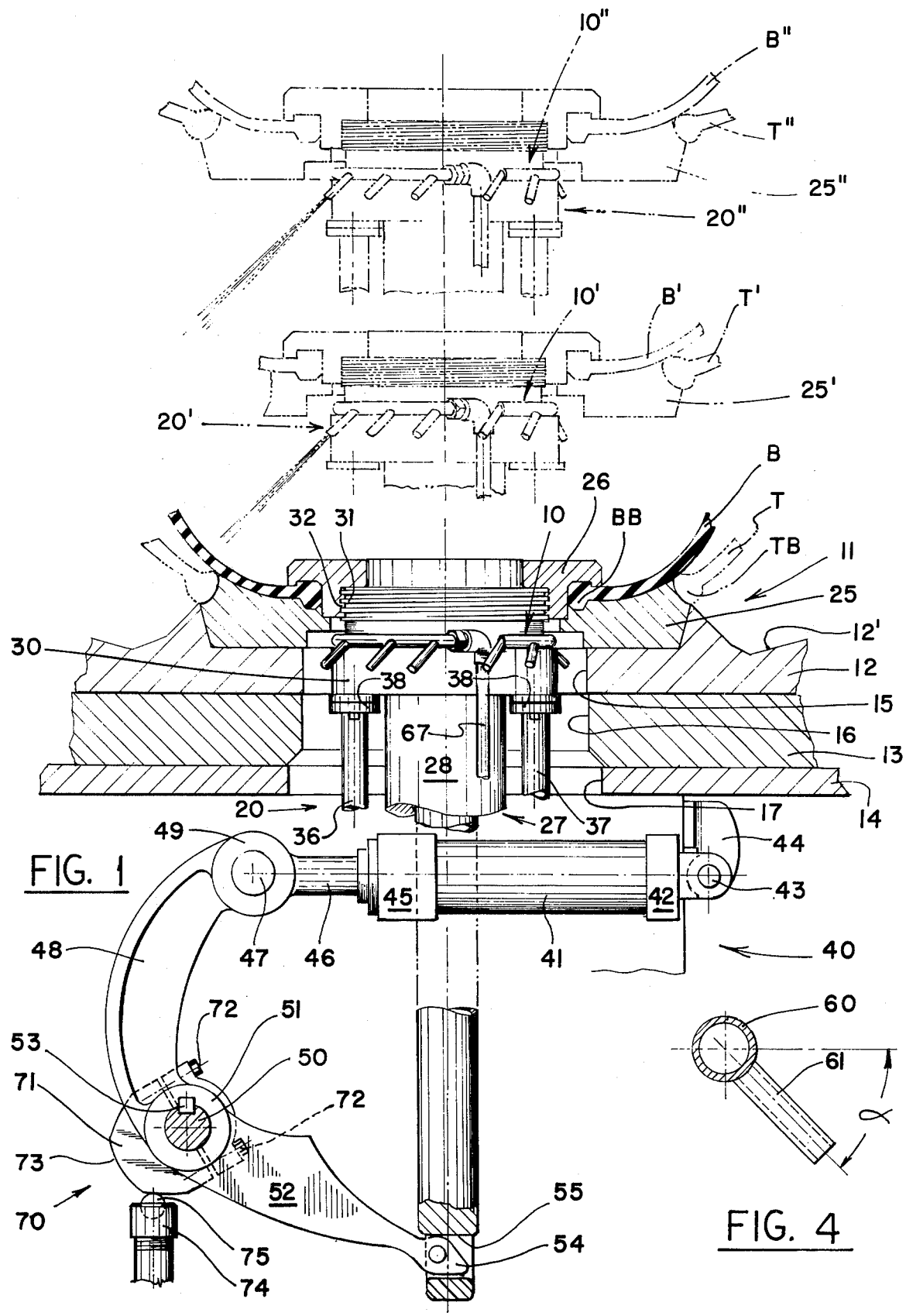

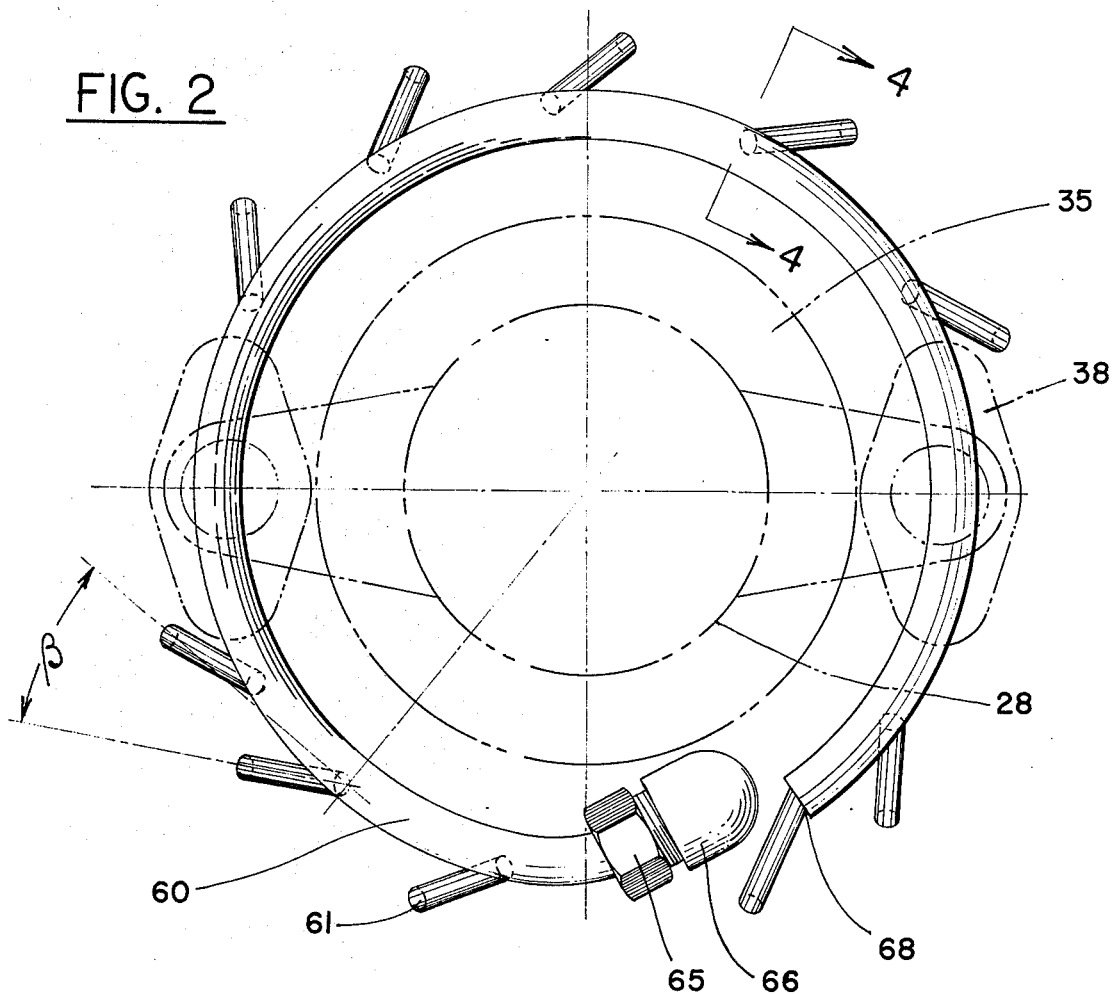
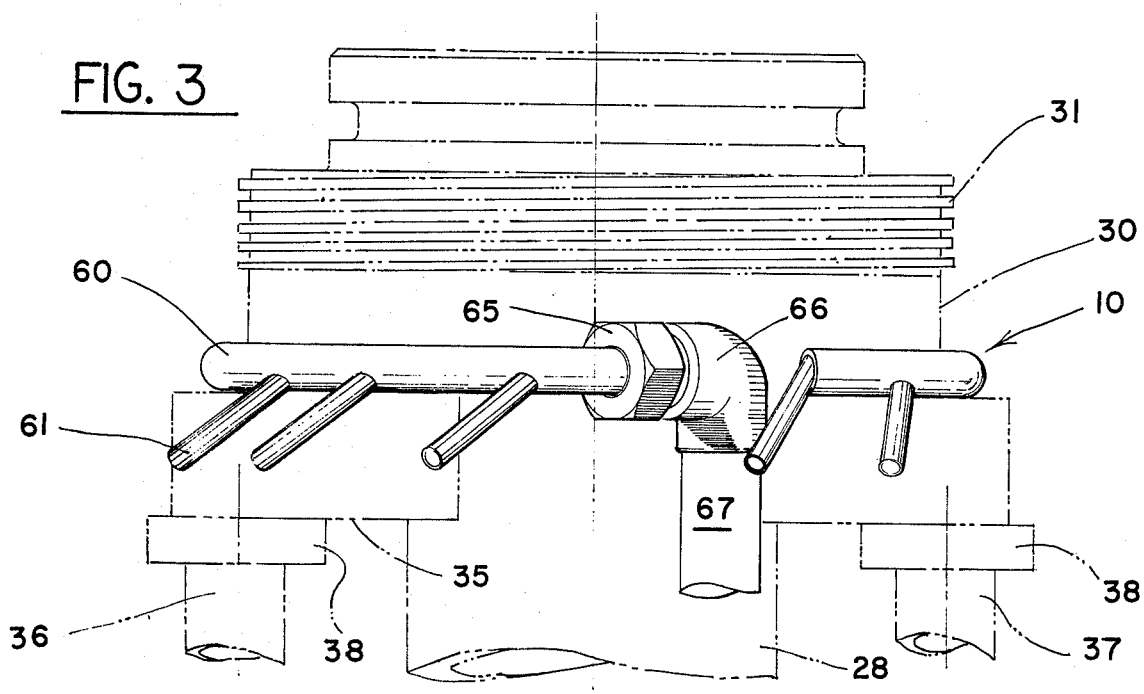

MOLD BLOW OUT APPARATUS

BACKGROUND OF THE INVENTION

The present invention relates to apparatus for utilization in presses for shaping and curing tires. More particularly, the present invention relates to apparatus for blowing out the lower mold section of a press for shaping and curing tires between the time of removal of a cured tire and the time that a green or uncured tire carcass is inserted for a subsequent shaping and/or curing operation. More specifically, the invention relates to apparatus for removing foreign matter from the lower mold section of a tire shaping and curing press by the positioning of a movable source of pressurized fluid in proximate relation to the lower mold section for loosening and clearing residual foreign matter from a curing cycle to preclude the formation of defects or other anomalies in tires to be processed during subsequent curing cycles.

Attention has long been given to the problem of effecting sufficient removal of residual foreign matter from a mold subsequent to the curing of a tire and prior to the insertion of a further tire for subsequent shaping and/or curing operations. In early curing press applications, a hose and nozzle configuration attached to a source of compressed air was normally manually manipulated with respect to the lower mold section between tire removal and insertion for the elimination of "tramp rubber" in the form of pin vent particles and other foreign material created during the curing and removal of a tire from the molds of a press. Efforts to effect removal of such foreign matter by a manually manipulated air source were and remain generally unsatisfactory in most instances due to the difficulties in appropriately positioning the hose and nozzle in the necessary positions relative to the lower mold section. These difficulties are brought about by the reach limitations of an individual, the inaccessibility of certain portions of the mold, and the size and configuration of the molds, particularly in respect to truck and larger size curing presses. Efforts at such manual removal of foreign material, to the extent successful, were accompanied by substantial risk to the press operators due to the temperature of the mold and related components during the cleaning cycle and the necessity for positioning a nozzle in relatively close proximity to the mold section for successfully effecting removal of the foreign matter.

More recently, efforts have been made to increase the effectiveness of the removal of foreign material from lower mold sections while coincidentally reducing the danger to press operators. These efforts have resulted in the development of pressurized fluid systems positioned outwardly of the mold registry area on the press and consisting of one or more nozzles directed toward the lower mold section and connected through suitable valving to effect the dispensing of a fluid for removal of foreign matter in an appropriate timing sequence in relation to the press operating cycle. Such automated operation was also effective to reduce the attention required by press operators during the evolution of largely automated presses.

However, such nozzle installations positioned exteriorly of the mold registry area and normally outwardly of the shield area have proved to be less than satisfactory under many circumstances since the fluid discharged from the nozzles must effect foreign matter removal across substantially the entire diameter of the mold and discharge from the diametrically opposite portion thereof. This is particularly true in conjunction with larger mold configurations due to the extreme spacing between the nozzles and portions of the mold area to be cleaned. This distance becomes even more critical due to the limitations with respect to normally available sources of air pressure in a conventional factory environment. Further, the positioning of a few nozzles exteriorly of the mold registry area necessarily creates areas of the mold which are either totally unaffected or substantially unaffected by the fluid expelled from nozzles so positioned. The use of more than a few nozzles thus positioned would result in intersecting fluid streams which would necessarily derogate from the effectiveness of each of the fluid streams thus involved.

SUMMARY OF THE INVENTION

Therefore, an object of the present invention is to provide automatic mold blow out apparatus which is capable of effecting the processing requirements for molds of differing sizes and configurations. Another object of the invention is to provide mold blow out apparatus which is positioned in such a manner as to effect a fluid scrubbing and sweeping of the entire lower mold section. A further object of the present invention is to provide mold blow out apparatus which effects discharge of foreign matter from the lower mold section.

Still another object of the invention is to provide mold blow out apparatus which as a function of time directs fluid over different areas of a lower mold section at differing angles of incidence to effect a loosening of pin vent particles and other foreign matter which might otherwise be retained in the mold such as to produce defects in tires subsequently processed in the mold. A further object of the invention is to provide mold blow out apparatus which may be used in conjunction with a number of differing press and center mechanism configurations. Yet another object of the invention is to provide mold blow out apparatus which may be installed in conjunction with most existing press and center mechanism configurations without the necessity for modification thereto.

Yet a further object of the invention is to provide mold blow out apparatus which conveniently provides discharge of pressurized fluid from a plurality of nozzles each positioned proximate to the portion of the lower mold section area contacted by the discharged fluid. Still another object of the invention is to provide mold blow out apparatus wherein the nozzles are preferably to an extent tangentially oriented with respect to the center mechanism and the lower mold sections such that a circular swirling flow path is created in the proximity of the lower mold section for purposes of both loosening residual foreign matter in the mold section and producing effective discharge of the foreign matter from the mold section. Yet a still further object of the invention is to provide mold blow out apparatus which is of relatively simple construction, is inexpensive, and is constructed for a high degree of operational reliability.

These and other objects, together with the advantages thereof over existing and prior art forms which will become apparent from the following specification, are accomplished by the means hereinafter described and claimed.

In general, a curing press for tires embodying the concepts of the present invention has relatively movable upper and lower mold sections, a center mechanism located centrally of the mold sections, a housing in the center mechanism, a hub attached to the housing, a bead ring carried by the hub for engaging the lower bead of a tire, a lift mechanism operatively engaging the housing for moving the hub relative to the lower mold section, and mold blow out apparatus on the hub for directing pressurized fluid into contact with the lower mold section during the movement of the hub relative to the lower mold section to remove residual foreign matter therefrom.

DESCRIPTION OF THE DRAWINGS

FIG. 1 is an elevation view of mold blow out apparatus embodying the concepts of the present invention and depicted in operative position with respect to portions of a tire curing press, some of which are depicted in cross-section, the mold blow out ring being shown in three differing positions assumed during the operating sequence;

FIG. 2 is a top plan view of the mold blow out apparatus of FIG. 1;

FIG. 3 is an enlarged fragmentary view of a portion of the mold blow out ring of FIG. 1; and FIG. 4 is a section view taken substantially along the line 4—4 of FIG. 2 and depicting particularly the angularity of the output nozzles of the mold blow out ring with respect to a horizontal plane related thereto.

DESCRIPTION OF THE PREFERRED EMBODIMENT

A mold blow out apparatus according to the concept of the present invention, as generally indicated by the numeral 10 in the attached drawings, may be incorporated in various types and constructions of presses designed to shape and cure tires wherein the lower bead ring or other lower tire bead supporting member is elevated during a portion of the operating cycle as for effecting removal of a cured tire from the press and/or providing for insertion of automatic or semiautomatic tire unloading apparatus in the area above the lower mold section. An exemplary press of a type embodying such features is disclosed in prior U.S. Pat. No. 2,911,670 owned by applicant's assignee to which reference may be made for a full description of the structure and an operating sequence of such a press configuration.

Referring now to the drawings a portion of a suitable press, generally indicated by the numeral 11, is shown in sufficient detail for an understanding of the structure and operation of the mold blow out apparatus 10. The press 11 is depicted as having a lower mold section 12 with a relatively movable mating upper mold section (not shown), the mold sections being selectively separable during facets of the shaping and curing cycle. As shown, the lower mold section 12 is mounted on a fixed platen 13 which normally reposes on a bed plate 14 or other press component constituting a portion of a base or structural member of press 11. Exemplary press components for effecting movement of an upper mold section relative to the lower mold section 12 are described in prior U.S. Pat. No. 2,808,618 owned by applicant's assignee. It should, however, be appreciated that other forms of press operating mechanism known to persons skilled in the art may be employed so long as sufficient clearance is provided during the press opening function subsequent to the curing operation such that a lower bead lift function for elevating a cured tire may be accomplished.

The lower mold section 12, platen 13, and bed plate 14 have central apertures 15, 16 and 17, respectively, to receive a center mechanism, generally indicated by the numeral 20. In the lowermost position shown in the solid line depiction of FIG. 1 the portion of the center mechanism 20 extending about the lower mold section 12 includes a conventional flexible bladder, diaphragm or bag B which may be made of a number of suitable elastomeric materials well known to persons skilled in the art. The bladder B may be either of the type which is open at both ends and is preferably of a generally annular configuration and symmetrical about the horizontal centerline thereof or which has the upper end thereof closed but is otherwise substantially identical.

Whatever may be the exact configuration of the bladder B, there is provided thereon a lower bead area BB which is sealingly clamped in a manner to be described to permit selective radial expansion and contraction of the bladder B upon the introduction of and withdrawal of fluids interiorly thereof. This clamping of the lower bead area BB of bladder B is effected by engagement between lower bead ring 25, which also provides a seat for the lower bead TB of a tire band T, and a lower bladder clamp ring 26. In order to permit bladder change for installing a different size bladder B or for replacement of worn bladders, the lower bead ring 25 and the lower bladder clamp ring 26 are selectively detachably secured as by bolts or other removable fastening members (not shown).

The lower bead ring 25 is selectively positionable in registry with the lower mold section 12 as depicted in solid lines in FIG. 1 or extended thereabove as shown in the chain line depictions of FIG. 1. The requisite relative manipulations of the extremities of the bladder B are effected by a cylinder mechanism, generally indicated by the numeral 27. The cylinder mechanism 27 includes a cylindrical housing 28 which is positioned interiorly of the apertures 15, 16, 17 of the lower mold section 12 and platen 13. The upper end of housing 28 carries a lower clamp ring hub 30 which is exteriorly threaded over a portion thereof, as at 31, for selective attachment to an interiorly threaded portion 32 of the lower bladder clamp ring 26. Thus, both the lower bladder clamp ring 26, and the lower bead ring 25 carrying the bladder B and the lower bead TB of a tire T move with the lower clamp ring hub 30.

Fluid is provided interiorly of the bladder B in a conventional manner to sequentially provide the requisite shaping and curing fluids for positioning an uncured tire band against the tire mold and supplying the temperature and pressure interiorly thereof which is necessary to effect an optimum cure in a minimum time. These fluids are expelled from the lower clamp ring hub 30 at a position above the lower bladder clamp ring 26. The supply of fluids to the lower clamp ring hub 30 through its undersurface 35 for the requisite ingress and egress to the bladder B is effected as by interchangeable inlet and outlet conduits 36 and 37, respectively, which are attached to undersurface 35 as by flanged connectors 38.

The vertical movement of the cylinder mechanism 27 including the housing 28, and the lower clamp ring hub 30 and components attached thereto including the lower bead ring 25 relative to lower mold section 12 is effected by a lift mechanism, generally indicated by the numeral 40. The exemplary lift mechanism 40 depicted in FIG. 1 of the drawings has as the drive component thereof an actuating cylinder 41 which has one extremity 42 thereof pivotally affixed at a pin 43 to a mounting bracket 44 which is rigidly fixed to a portion of the frame of the press 11 such as the bed plate 14. The opposite extremity 45 of the actuating cylinder 41, which may have a projecting cylinder rod 46, has its extremity attached to a pin 47. A lever arm 48 has a sleeve 49 at one extremity thereof which is freely rotatably attached to the pin 47 for purposes of converting linear motion of the cylinder rod 46 to angular motion of the lever arm 48 about a lift arm shaft 50 to which the other end of the lever arm 48 is attached by a hub 51. The lift arm shaft 50 also carries a lift arm 52 which projects generally in the direction of the cylinder mechanism 27. Both the lever arm 48 and the lift arm 52 are nonrotatably attached to the lift arm shaft 50, as by a key 53 such that angular displacement of the lever arm 48 is equiangularly transferred to the lift arm 52.

The resultant angular displacements of lift arm 52 are transferred to the cylinder mechanism 27 by an arcuate knob 54 which may be on an extremity of lift arm 52 and configured for engagement within a socket slot 55 formed preferably at the lower extremity of the cylinder mechanism 27. As can be readily seen from FIG. 1 of the drawings, the extension of cylinder rod 46 from the cylinder 41 would result in a rotation of lever arm 48 about lift arm shaft 50 such that an equal angular displacement of the lift arm 52 would move the rounded knob 54 thereof vertically upwardly carrying with it the cylinder mechanism 27. Such actuation of the cylinder lift mechanism 40 produces the vertical displacement from the solid line depiction of the center mechanism 20 in FIG. 1 to the intermediate chain line position of the center mechanism 20' and extreme extension of the cylinder rod 46 to the uppermost position of the center mechanism as exemplarily depicted by the chain line position denoted 20'' in FIG. 1.

The mold blow out apparatus 10 is carried by and preferably juxtaposed about the lower clamp ring hub 30 of the center mechanism 20. As best seen in FIGS. 2 and 3 the mold blow out apparatus 10 may have a generally tubular member 60 preferably of a substantially circular configuration such as to extend substantially about the entire periphery of a portion of the lower clamp ring hub 30 exteriorly of the bladder B. The tubular member 60 has at least one and preferably a plurality of nozzles 61 extending outwardly thereof. Both the tubular member 60 and the nozzles 61 may be constructed of copper, copper coated steel tubing, or other material resistant to the well known environmental influences of tire cutting presses. The nozzles 61, which may be plain cylindrical (as shown) or other configuration, are rigidly affixed to the tubular member 60 and the tubular member 60 attached to the lower clamp ring hub 30 as by brazing, tack welding or comparable fastening techniques as will be appreciated by a person skilled in the art. Although the number and positioning of the nozzles may be varied somewhat depending upon the diameter of the lower clamp ring hub 30, the presence of potentially interfering structure, such as flanged connectors 38, and other variables in press construction, a layout as shown in FIGS. 2 and 3 employing two or three of the nozzles 61 in each quadrant of the lower clamp ring hub 30 provides effective operation in most instances and shall be considered to constitute generally equal circumferential spacing in the context of this application.

Although the nozzles 61 must be directed downwardly from the horizontal to an extent to direct a pressurized fluid emitted therefrom into contact with the tire engaging surface 12' of the lower mold section 12, substantial variations in the downward angularity of nozzles 61 may be desirable to compensate for differing diameters and configurations of the lower clamp ring hub 30, the mold construction and other variables common in the tire curing industry. It has, however, been ascertained that a downward angular displacement of the nozzles 61 through an angle $\alpha$ as depicted in FIG. 4 of the drawings, of approximately 45° provides satisfactory operation in many instances. The angle $\alpha$ is also preferably appropriately selected depending on various parameters, such that upon upward displacement of the lower clamp ring hub of the center mechanism 20, the mold blow out apparatus 10 commences impingement of fluid expelled from the nozzles 61 upon minimal vertical displacement as depicted at the chain line position 10' in FIG. 1 of the drawings with the tire separated from the lower mold section 12 in the T' position. Further, the dispelled fluid is progressively directed radially outwardly on the tire engaging surface 12' of the lower mold section 12 as a function of vertical rise of the lower clamp ring hub 30 carrying the mold blow out apparatus 10 as can be seen in the chain line position 10'' depicted in FIG. 1 of the drawings.

Although the nozzles 61 may be directed at virtually any angularity outwardly of a tangent to the area of intersection of the axis thereof with the tubular member 60, it has been found that a substantially equal angularity for each of the nozzles 61 is advantageous at least in the instance of generally equal circumferential spacing. In addition, it has been found desirable that the nozzles 61 not be directed perpendicular to a tangent at the point of intersection of the axis thereof with tubular member 60, since an angular offset as depicted in FIG. 2, tends to produce a circumferential swirling effect with respect to the fluids dispelled from the nozzles 61 in relation to the lower mold section 12. Additionally, the angular offset produces a reinforcing effect in that the fluid dispelled from each of the nozzles 61 tends to maintain the fluid flow characteristics of fluid dispelled from the adjacent nozzle 61 positioned in the direction of discharge or counterclockwise in the layout of the drawings. It has been found that an angle $\beta$ between the axis of nozzles 61 and a tangent to the tubular member 60 at the intersection with a nozzle 61 of approximately 30° generally produces effective operation in the form of fluid swirling action about the tire engaging surface 12' of the lower mold section 12 such that foreign matter is effectively loosened or scrubbed from the tire engaging surface 12' and displaced outwardly of the lower mold section 12 rather than being merely displaced a distance radially outwardly but within the confines of the tire engaging surface 12'.

The tubular member 60 of the mold blow out apparatus 10 may conveniently be connected to a source of pressurized fluid, preferably air, which is commonly available for a multiplicity of purposes in the tire plant curing room environment. As shown, the tubular member 60 has a flange connector 65 attached at one end thereof which is adapted for mating engagement with what may be a conventional 90° elbow 66 which is connected to a conduit 67 (see FIG. 3). The tubular member 60 is otherwise continuous throughout its length except for the nozzles 61 positioned therein and the terminal end 68 which may be totally sealed by brazing or other fastening procedure employed in the attachment of a nozzle 61 thereat. It has been emperically determined that the employment of conventionally available air sources at approximately 100 psi in tire plant curing rooms provide adequate performance with a tubular member 60 of circular cross-section having approximately a one-half inch diameter and about eight or 10 nozzles 61 of circular cross-section having a diameter of approximately one-quarter inch.

In order to accomplish the aforedescribed dispelling of air or other fluid for impingement against the tire engaging surface 12' of lower mold section 12 progressively radially outwardly, air is preferably introduced upon vertical upward displacement of the center mechanism 20 over a portion of its travel commencing at a position where impingement upon the radial inner extremity of the tire engaging surface 12' of the lower mold section 12 is effected and continuing until just prior to reaching the uppermost position of the center mechanism travel. In a configuration of the general type depicted as the preferred embodiment of the present invention, the fluid input is energized after approximately 20% of the center mechanism travel, maintained over approximately 75% of its travel, and terminated with approximately 5% of the travel remaining. At this latter point, the effectiveness of the fluid is substantially reduced due to the displacement distance from the mold, and it is preferred that air not be expelled during the portion of the cycle when the center mechanism remains at its uppermost position due to the reduced effectiveness and the unnecessary drain on the air supply. Although it is normally advantageous that air be discharged during both upward and downward movement of the center mechanism 20 through the portions of the travel denoted above, it is possible that generally satisfactory operation can be achieved by energizing the air supply to the mold blow out apparatus 10 only during either the upward or downward displacement portions of the center mechanism operating cycle.

The cyclic supply of pressurized fluid to the tubular member 60 through the conduit 67 may be readily controlled in numerous ways which would be apparent to persons skilled in the art. As one example, a cam mechanism, generally designated by the numeral 70, may be provided to control this function. As shown the cam mechanism 70 may be driven from the lift arm shaft 50, the rotation of which is directly related to the vertical displacement of the cylinder 28 of center mechanism 20. The lift arm shaft 50 carries an adjustable two-piece collar 71 which is axially and rotationally secured on shaft 50 by cap screws 72. The collar 71 has a cam surface 73 which cooperates with a cam follower 74 having a roll 75 which engages the cam surface 73.

The follower 74 of cam mechanism 70 may mechanically operate a valve which may directly, or indirectly through another valve or other components, supply pressurized fluid via conduit 67 to the tubular member 60 in the cyclic manner specified above. It will be readily apparent to persons skilled in the art that any desired cyclic actuation of a fluid supply from the mold blow out apparatus 10 may be achieved in a variety of ways employing valves, switches, solenoids, and/or other control components.

I claim:

1. In a tire curing press having upper and lower mold sections and a center mechanism having a bladder and including a vertically movable hub carrying a ring for engaging the lower bead of a tire, mold blow out apparatus comprising, tubular means mounted exteriorly of the bladder on the movable hub of the center mechanism, conduit means communicating with and supplying pressurized fluid to said tubular means, and a plurality of nozzle means on said tubular means for directing the pressurized fluid into contact with the lower mold section to effect removal of residual foreign matter therein.

2. Apparatus according to claim 1, wherein said nozzle means are oriented downwardly to direct the pressurized fluid into contact with the lower mold section during vertical movement of the hub of the center mechanism.

3. Apparatus according to claim 2, wherein the impingement of the pressurized fluid on the lower mold section varies radially thereof as a function of the vertical movement of the hub of the center mechanism.

4. Apparatus according to claim 2, wherein said nozzle means are directed downwardly from a horizontal plane at an angle of approximately 45°.

5. Apparatus according to claim 1, wherein said tubular means is substantially circular and disposed about the periphery of the hub of the center mechanism.

6. Apparatus according to claim 5 wherein said nozzle means is a plurality of cylindrical members generally equally circumferentially spaced about said tubular means.

7. Apparatus according to claim 5, wherein said nozzle means are angularly offset from a direction radially of said tubular means and the hub such as to produce a circumferential swirling action of the pressurized fluid about the lower mold section.

8. Apparatus according to claim 7, wherein the axis of each of said nozzle means is displaced outwardly of a tangent to said tubular means at its intersection with each said nozzle means at an angle of approximately 30°.

9. Apparatus according to claim 1, including means for providing cyclic supply of pressurized fluid through said conduit means to said tubular means over a portion of the travel of the vertically movable hub.

10. A curing press for tires having relatively movable upper and lower mold sections comprising, a center mechanism, housing means in said center mechanism, hub means attached to said housing means, bead ring means for engaging the lower bead of a tire carried by said hub means, lift mechanism means operatively engaging said housing means for moving said hub means relative to the lower mold section, and mold blow out means on said hub means for directing pressurized fluid into contact with the lower mold section during the movement of said hub means relative to the lower mold section to remove residual foreign matter therefrom.

11. Apparatus according to claim 10, including control means providing a supply of pressurized fluid to said mold blow out means during a portion of the movement of said hub means relative to the lower mold section.

12. Apparatus according to claim 11 wherein said control means includes cam means operating in conjunction with said lift mechanism means.

13. Apparatus according to claim 10 wherein said bead ring means engages the lower bead of a tire so that the movement of said bead ring means effected by said lift mechanism means separates a tire from the lower mold section.

14. Apparatus according to claim 10 wherein said mold blow out means includes tubular means circumposed about said hub means and a plurality of nozzles directing the pressurized fluid from said tubular means.

* * * * *

UNITED STATES PATENT OFFICE
CERTIFICATE OF CORRECTION

PATENT NO. : 4,029,449
DATED : June 14, 1977
INVENTOR(S) : Robert E. Longaberger It is certified that error appears in the above-identified patent and that said Letters Patent are hereby corrected as shown below:

At Col. 1, between the inventor and filing date insert:

--ASSIGNEE: McNeil Corporation, Akron, Ohio--

At Col. 5, line 54, "cutting" should read --curing--.

Signed and Sealed this

Sixth Day of November 1979

[SEAL]

Attest:

RUTH C. MASON
Attesting Officer

LUTRELLE F. PARKER
Acting Commissioner of Patents and Trademarks